(12) United States Patent
Kaufmann

(10) Patent No.: US 8,221,662 B2
(45) Date of Patent: Jul. 17, 2012

(54) INJECTION MOLD FOR THE PRODUCTION OF AN INJECTION-MOLDED PART FROM A RIGID PLASTIC LAYER AND A PLASTIC FOAM SURFACE LAYER

(75) Inventor: Georg Kaufmann, Fislisbach (CH)

(73) Assignee: Georg Kaufmann Formenbau AG, Busslingen (CH)

( * ) Notice: Subject to any disclaimer, the term of this patent is extended or adjusted under 35 U.S.C. 154(b) by 0 days.

(21) Appl. No.: 12/512,493

(22) Filed: Jul. 30, 2009

(65) Prior Publication Data
US 2010/0038811 A1    Feb. 18, 2010

Related U.S. Application Data

(63) Continuation of application No. PCT/EP2008/000672, filed on Jan. 29, 2008.

(30) Foreign Application Priority Data

Jan. 30, 2007  (EP) .................................. 07 101 386

(51) Int. Cl.
  *B29C 67/00* (2006.01)
(52) U.S. Cl. ......................... 264/46.4; 264/45.5; 264/52
(58) Field of Classification Search ................. 264/46.4, 264/45.5, 52
  See application file for complete search history.

(56) References Cited

U.S. PATENT DOCUMENTS

| 3,390,213 | A | * | 6/1968 | Szerenyi et al. | ............ | 264/45.2 |
| 4,174,988 | A | * | 11/1979 | Moore et al. | .................. | 156/213 |
| 2002/0163100 | A1 | * | 11/2002 | Damo | ........................... | 264/239 |
| 2003/0052513 | A1 | * | 3/2003 | Uleski | ........................... | 296/152 |

FOREIGN PATENT DOCUMENTS

| DE | 10 2005 024 776 A1 | 12/2006 |
| EP | 0 495 712 A1 | 7/1992 |
| EP | 1 674 235 A1 | 6/2006 |

* cited by examiner

*Primary Examiner* — Yogendra Gupta
*Assistant Examiner* — John Robitaille
(74) *Attorney, Agent, or Firm* — Muncy, Geissler, Olds & Lowe, PLLC

(57) ABSTRACT

An injection mold is provided for the production of an injection molding having a stiff plastics layer and a foamed-plastic surface layer, with at least one undercut region and comprising two mold halves and comprising one or more sliding elements, which delimit a mold cavity with a convex and a concave side. Whereby, there is a first sliding element provided on the convex side of the mold cavity, and this sliding element has been designed so as to interlock with the first mold half more distant from the undercut region, and is movable with this same mold half, in the same direction, after the injection of the stiff plastics backing layer and of the polymer melt forming the foamed-plastic surface layer, in the step of decompression of the polymer melt forming the foamed-plastic surface layer.

3 Claims, 1 Drawing Sheet

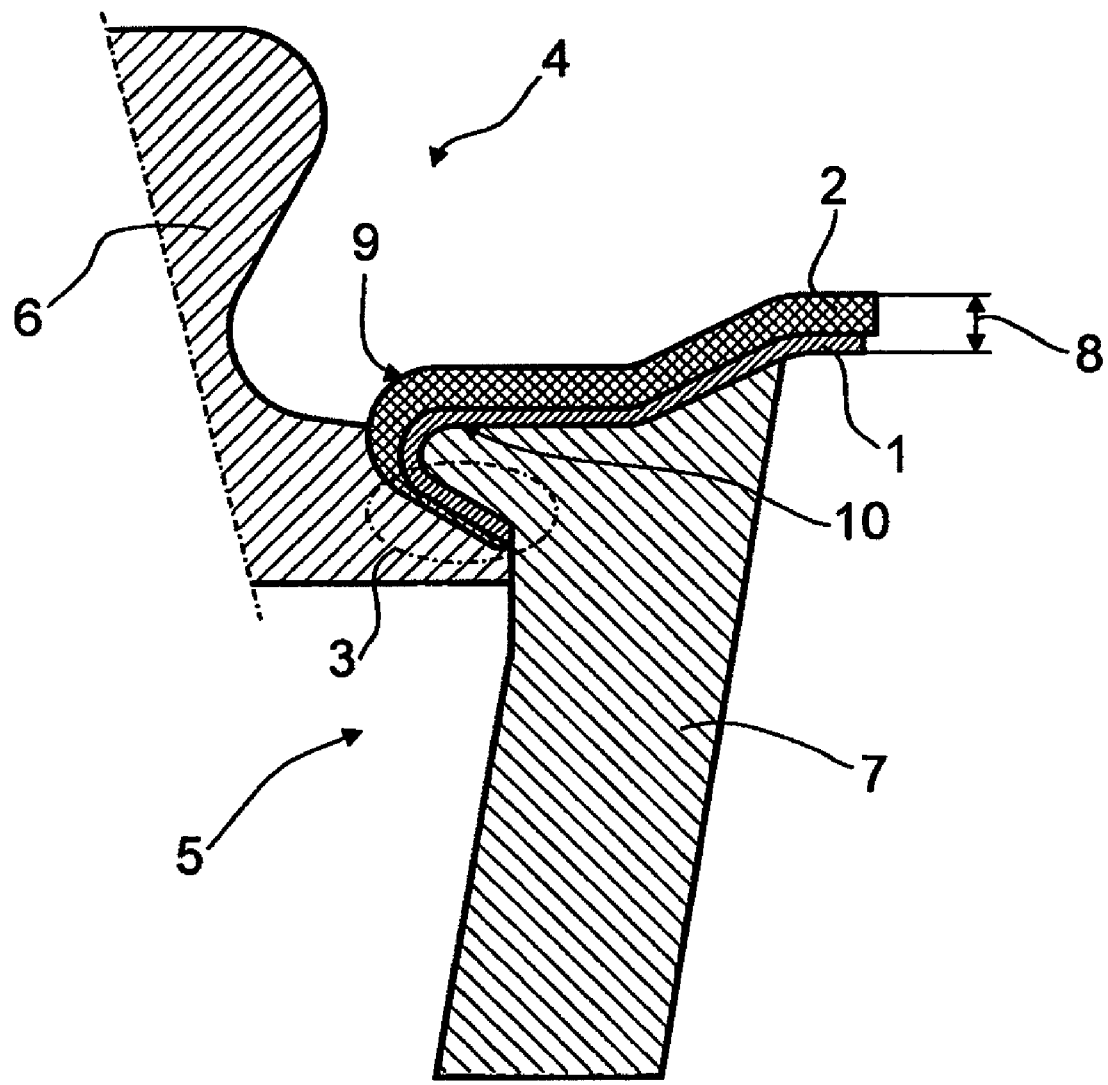

INJECTION MOLD FOR THE PRODUCTION OF AN INJECTION-MOLDED PART FROM A RIGID PLASTIC LAYER AND A PLASTIC FOAM SURFACE LAYER

This nonprovisional application is a continuation of International Application No. PCT/EP2008/000672, which was filed on Jan. 29, 2008, and which claims priority to European Patent Application No. 07 101 386.6, which was filed in the European Patent Office on Jan. 30, 2007, and which are both herein incorporated by reference.

BACKGROUND OF THE INVENTION

1. Field of the Invention

The present invention relates to an injection mold for the production of an injection molding composed of a stiff plastics layer and of a foamed-plastic surface layer, with one or more undercut regions.

2. Description of the Background Art

Suitable plastics for stiff plastics backing layer, and the foamed-plastic surface layer, are known and are described by way of example in EP 06 111 792.5.

The injection molding with one or more undercut planes can in particular be an instrument panel.

The term undercut regions is used for all of the regions of injection moldings, in the present case instrument panels for motor vehicles, which are not visible on viewing perpendicularly with respect to the parting surface of the injection mold for the injection molding. It is desirable here that the material forming the foamed-plastic surface layer is also applied in the undercut region to the stiff plastics backing layer. However, a particular intention is that the visible edge, i.e. the region of transition between the visible region and the undercut region of the injection molding, be esthetically attractive, and of regular shape, designed with a foamed-plastic surface layer in a prescribed thickness.

SUMMARY OF THE INVENTION

It is therefore an object of the present invention to provide an injection mold which permits the production of injection moldings, in particular of instrument panels, with one or more undercut regions, and which can give, at a region of transition to the undercut region or to the undercut regions, visible edges which are fully satisfactory both in esthetic terms and in terms of service properties, in particular the thickness of the molded-plastic surface layer.

The object is achieved by an injection mold for the production of an injection molding composed of a stiff plastics layer and a foamed-plastic surface layer, with at least one undercut region, and comprising two mold halves and comprising one or more sliding elements, which delimit a mold cavity with a convex and a concave side. Whereby, in an embodiment there is a first sliding element provided on the convex side of the mold cavity, and this sliding element has been designed so as to interlock with the first mold half more distant from the undercut region, and is movable with this same mold half, in the same direction, after the injection of the stiff plastics layer and of the polymer melt forming the foamed-plastic surface layer, in the step of decompression of the polymer melt forming the foamed-plastic surface layer.

Injection moldings with one or more undercut regions can advantageously be produced by a process, where from a stiff plastics backing layer and a foamed-plastic surface layer with one or more undercut regions, via injection molding in an injection mold, comprising two mold halves, and also comprising a sliding core, where, in a mold cavity between two mold halves and the sliding core, firstly the stiff plastics backing layer is formed via injection molding and then a polymer melt comprising blowing agent and forming the foamed-plastic surface layer is injected, where the polymer melt forming the foamed-plastic surface layer is decompressed by displacing the first mold half, more distant from the undercut region, together with the sliding core, in the same direction, in such a way that the height of the mold cavity is reduced in the undercut region and increased elsewhere, where the polymer melt forming the foamed-plastic surface layer is compressed in the undercut region and is expanded elsewhere in the mold cavity.

The injection mold of the invention has two mold halves which are opened on removal of the injection molding in a conventional manner, i.e. perpendicularly with respect to the parting surface of the injection mold.

The injection mold moreover has one or more sliding elements, i.e. mold parts with a direction of movement which deviates from the mold-opening movement, i.e. from the movement of the two mold halves perpendicularly with respect to the parting surface.

The parts of the injection mold, i.e. the two mold halves and the one or more sliding elements, delimit a mold cavity which accordingly can have one or more convex and one or more concave sides, since the injection molding has one or more undercut regions.

The design of the injection mold of the invention can be such that there is a first mold half provided on that side of the mold cavity more distant from the undercut region, and is such that a first sliding element has been designed to interlock with this same mold half, and, after the injection of the stiff backing layer and of the polymer melt forming the foamed-plastic surface layer, in the step of decompression of the polymer melt, this sliding element is movable with the upper mold half in the same direction.

Because, therefore, the first sliding element and the first mold half intermesh seamlessly into one another in the step of decompression of the polymer melt forming the foamed-plastic surface layer, and are moved in the same direction, the injection moldings produced have, in the particularly critical region of the visible edges in the region of transition to the undercut regions, a smooth, seamless region of transition, with excellent optical and mechanical properties.

It is preferable that the injection mold of the invention has, on the concave side of the mold cavity, a further sliding element, designed so that it can be swiveled out from the undercut region. This provides reliable and simple opening of the injection mold, where the second mold half adjacent to the second sliding element, opens first, and then the second sliding element is swiveled out from the undercut region, thus permitting the removal of the finished injection molding.

It is preferable that the second sliding element has been designed so that it can be prevented from displacement, in particular so that it can be fixed with respect to displacement via the pressure from the polymer melt injected into the mold cavity and forming the foamed-plastic surface layer. This can be achieved, for example, using a locking bar, which is opened or closed as required.

The injection mold is particularly suitable for the production of instrument panels for motor vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein: the single FIGURE, FIG. 1, shows one preferred embodiment of an injection mold.

DETAILED DESCRIPTION

The single FIGURE shows an embodiment of an injection mold of the invention for the production of an injection molding with a stiff plastics backing layer 1 and with a foamed-plastic surface layer 2, with an undercut region 3, where the injection mold is composed of two mold halves, 4 and 5, and also of two sliding elements, 6 and 7, where the first sliding element 6 has been arranged on the convex side 9, and the second sliding element 7 has been arranged on the concave side 10, of the mold cavity 8. The first sliding element 6 has been designed so as to interlock with the first mold half 4, and the second sliding element 7 has been designed so that it can be swiveled out of the undercut region 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A process for producing an injection molding having a stiff plastics layer and a foamed-plastic surface layer, the process comprising:

providing an injection mold having at least one undercut region and having two mold halves and having one or more sliding elements, which delimit a mold cavity with a convex and a concave side;

configuring a first sliding element provided on a convex side of the mold cavity so as to interlock with the first mold half more distant from the undercut region and is displaced with this same mold half in a same direction after an injection of the stiff plastics backing layer and of a polymer melt forming the foamed-plastic surface layer; and decompressing the polymer melt forming the foamed-plastic surface layer such that a height of the mold cavity is reduced in the undercut region and increased elsewhere where the polymer melt forming the foamed-plastic surface layer is compressed in the undercut region and expanded elsewhere in the mold cavity.

2. The process as claimed in claim 1, wherein the process is performed in an injection mold which has a second sliding element on a concave side of the mold cavity, and wherein the sliding element is prevented from displacement via the pressure of the polymer melt injected into the mold cavity and forming the foamed-plastic surface layer.

3. The process as claimed in claim 2, wherein the second sliding element is configured such that it is swivable out from the undercut region.

* * * * *